Oct. 12, 1965 R. W. JONES 3,211,984

CHARGE STORAGE CIRCUIT

Filed Nov. 28, 1961

INVENTOR
RICHARD W. JONES

BY George J. Netter

United States Patent Office 3,211,984
Patented Oct. 12, 1965

3,211,984
CHARGE STORAGE CIRCUIT

Richard W. Jones, Apalachin, N.Y., assignor to International Business Machines Corporation, New York, N.Y., a corporation of New York Filed Nov. 28, 1961, Ser. No. 155,306
6 Claims. (Cl. 320—1)

The present invention is concerned broadly with charge storage circuits, and, more particularly, with such circuits having exceptionally fast and substantially constant charge storing abilities.

It is frequently of value in the data processing arts, and particularly so in the electrical computing art, to generate voltages having magnitudes corresponding to the peak amplitude of information signals of varying amplitude, termed peak detection, or in certain other contexts, "sampling." This is customarily accomplished by charging a capacitance of appropriate predetermined value to the peak value of the information pulse. However, as is well known to those skilled in the electrical arts, a capacitance cannot maintain a given charge condition for any length of time without suffering decay, that is, dissipation of the charge, unless steps are taken to compensate for leakage of the charge from the capacitance.

In addition, when a charging voltage is initially impressed on a capacitance it would be useful if the capacitor could immediately accept the charge and thereby become instantaneously charged to the full extent of its capability. However, this is not the case and a finite period of time is necessary for the charging of a capacitor which period is fundamentally dependent upon the value of the capacitance.

It is, therefore, an object of the invention to provide an improved charge storage circuit wherein the storage capacitance on discharging reflects substantially its true value to the output.

A further object of the present invention is to provide an improved charge storage circuit including a storage capacitance in which compensation is provided for leakage of charge from the capacitance.

Another object of the invention is to provide such a circuit in which voltages to be stored see a relatively low capacitance during charging.

Briefly, the objects of the invention are accomplished by interconnection of a storage capacitance with an active discharging current compensation network and a charging current dissipation path. The dissipation path is of such character that during charging of the storage capacitance a low resistance path to electrical ground is provided. On discharging the compensation network serves both to reinforce the discharging current and to counteract the current dissipation path.

The foregoing and other objects, features and advantages of the invention will be apparent from the following more particular description of preferred embodiments of the invention as illustrated in the accompanying drawings.

Figure 1:
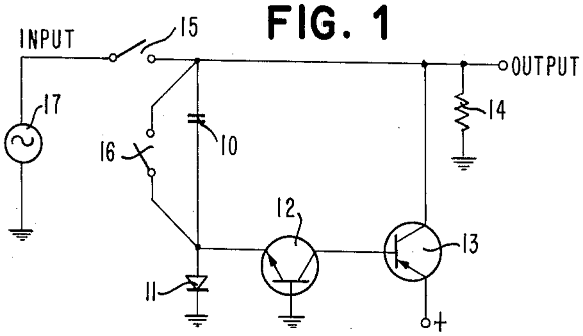
FIGURE 1 is a representative circuit illustrating the main features of the present invention.

Referring to FIGURE 1, the illustrated circuit is seen to consist of a storage capacitor 10, a unidirectional current element 11, first and second transistor elements 12 and 13, a load resistance 14 and first and second switching means 15 and 16. The electrical connections of the different component elements comprising the circuit are such as to cooperatively form a means for accomplishing the purposes and objects of the invention which in its most elementary expression is the provision of an apparent low capacitance during charging while providing a seeming high capacitance on discharge.

As to the detailed electrical connective aspects, an input signal to be stored, illustrated generally at 17, is passed through the first switching means 15 to one terminal of the capacitor 10 for providing an electric signal having a ground reference. The other terminal of the capacitor is connected to the unidirectional current means 11 arranged in forward direction with its other terminal tied to ground. The second switching means 16 is shunted around the capacitor. The common point of the capacitor and the means 11 is connected to the emitter of the first transistor element 12, the base of which is grounded while its collector is interconnected with the base of the second transistor element 13. The emitter of the element 13 is supplied with appropriate positive electrical bias from a source (not shown) while the collector is electrically related to the common point of the switching means 15 and the capacitor. The load resistance 14 interconnects the collector of the element 13 and ground and serves as an output for the circuit as indicated.

As to operation of the above-described circuit, assume initially that switching means 15 is open and that the capacitor 10 is charge free, the latter condition being obtained here by closing switching means 16 momentarily to drain off any accumulated electric charge from the capacitor. With switching means 16 once again in the open position, switching means 15 is closed interconnecting the signal source 17 and the storage capacitor 10. Charging current supplied by the source 17 passes through switching means 15 (now closed), the capacitor 10 and the unidirectional current means 11 to ground. This charging current path is a direct result of the relatively low electrical resistance of the means 11 arranged in forward direction between the capacitor and ground, as against the relatively high resistance values, respectively, of the load resistance 14, the emitter-to-base of the NPN transistor element 12, and the collector-to-base of the PNP transistor element 13 which is otherwise unbiased at this time.

Passage of electrical current through the capacitor causes accumulation, or storage, of electric charge in accordance with certain well-known electro-physical principles. This accumulation continues until a certain maximum quantity of charge is retained, which quantity is determined primarily by the capacitance value of the capacitor. Moreover, throughout charging the emitter of the transistor element 12 is maintained electrically positive with respect to its grounded base thereby biasing the transistor element 12 to the off condition. With the element 12 biased off there is substantially zero voltage potential on the base of the transistor element 13, and, therefore, despite the presence of a positive bias on its emitter, the element 13 is also in the off condition throughout charging.

In summary of the charging operation, the incoming signal from the source 17 sees substantially only the capacitance of the capacitor 10 and the small amount of resistance presented by the unidirectional current means 11 to current passing through it in its forward direction.

After allowing a sufficient time for the storage capacitor to become fully charged the switching means 15 is opened interrupting the supply of charging current from the source 17. Now the charge stored on the capacitor begins to leak off along a current path opposite that of the charging current, or, more specifically, from the capacitor through the load resistance 14 to ground. Since the back resistance of the unidirectional current means 11 is relatively high and polarity of the emitter of the transistor element 12 is now negative with the reversed direction of current flow through the capacitor, the discharge current path is from ground through the element 12 and out the emitter rather than through the means 11 as in charging.

Moreover, because of transistor action the discharge current causes current to flow in the base of the transistor element 13 and in the collector of the same. The current in the collector has a value equal to (B2)(I) where B2 is the current gain factor of the transistor 13 and I is the discharge current from the capacitor. The effect of the collector current is to simultaneously increase current flow through the load resistance and to oppose I through the capacitor. Reduction of I effects a concomitant reduction in the collector current, which interaction of currents continues until an equilibrium state is reached where the final value of I is equal substantially to (1/B2) of the total current passing through the load resistance.

In summation, as the storage capacitor provides a discharge current the elements 12 and 13 through transistor action supplement the discharging current and in this manner make the capacitor appear to have a capacitance value approximately equal to (B2)(C), where C is its true, or actual, capacitance and B2 is the above-mentioned current gain factor of the element 13.

Figure 2:
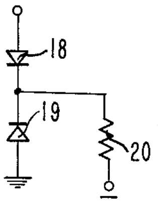
FIGURE 2 shows a modified form of one part of the circuit of FIG. 1.

In the preceding description it was noted that although the forward resistance of the unidirectional current means 11 is relatively low some does exist and a voltage drop occurs across it during the charging cycle. Additionally, during discharge a voltage drop is experienced from the base-to-emitter of the transistor element 12. Both of these voltage drops represent a static difference between the signal source voltage and output voltage as read across resistance 14, and, accordingly, removing these voltage drops, or providing a compensating means, results in a further enhancement of the basic circuit of the invention. The modification shown in FIG. 2 provides such a compensating means. Electrically the illustrated modification is substituted in its entirety for the means 11.

As to details, the circuit of FIG. 2 comprises a pair of unidirectional current means 18 and 19 each having an anode and a cathode, and arranged serially with their cathodes in common connection and their anodes connected, respectively, to ground and the common point of the capacitor 10 and the emitter of element 12. A compensating resistance 20 interconnects a negative bias voltage source (not shown) and the common cathode connection of the means 18 and 19. The value of the resistance 20 is such relative to the negative bias source as to provide a compensating current of sufficient magnitude to overcome the above-noted voltage drops and thereby reinforce the charging and discharging currents a corresponding amount.

Implicit in the operation of the circuit as connected in FIG. 1, or with the modification of FIG. 2, is that only input signals of positive polarity are accommodated by the circuit. Thus, it is easily seen that negative signals are not stored by the capacitor because of the relatively high back resistance of the means 11 (or the means 18) encountered by charging currents in this case. This circuit can be easily modified to accept and store negative electric signals by reversing the connections of the active polarity sensitive elements, as will be apparent to one skilled in the electronic arts.

Figure 3:
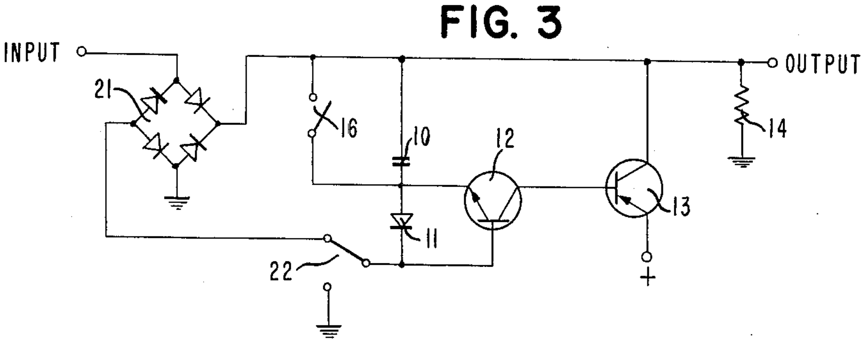
FIGURE 3 is an alternate embodiment having capabilities for accommodating bipolar values of input charging voltages.

However, under certain circumstances it is important to be able to store signals irrespective of their polarities, and the circuit set forth in FIG. 3 is an alternate embodiment of the invention having this advantageous capability. The basic operative portions are identical with those of the circuit of FIG. 1 and those components which are common to the two circuits are provided with the same reference numbers. In addition, a full-wave rectifying bridge 21 is electrically connected from the upper common point of the switching means 16 and the capacitor 10 to one fixed point of a switching means 22. The other fixed point of the means 22 is grounded whereas the movable strap of the same is in common with the cathode of the means 11 and the base of the transistor element 12. Voltage signals to be stored are applied to the bridge 21 at the INPUT with ground as a reference as illustrated.

As to operation, the description set forth above on the functioning of the circuit of FIG. 1 is applicable here when taken in conjunction with the comments that immediately follow. During charge storage time, the switching means 22 is set to place the output portions of the bridge across the series arrangement of the capacitor 10 and means 11, which presents a charging voltage of constant positive polarity at the upper or common junction of the capacitor with the collector of the transistor element 13. On the other hand, during a discharge cycle the movable strap of the switching means 22 is set to ground serving both to reference the OUTPUT to ground and to isolate it from further signals at this time via the bridge.

Figures 4, 5:
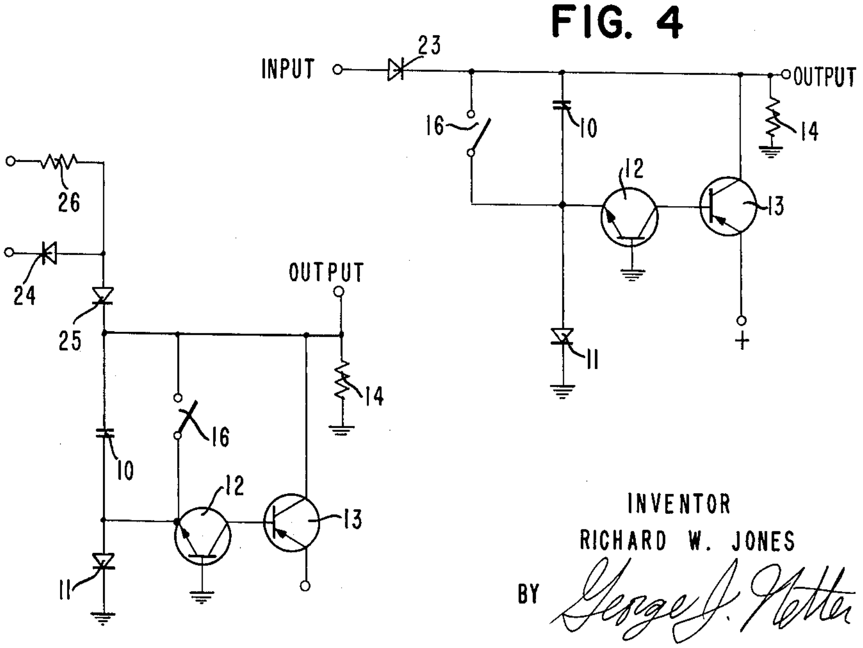
FIGURE 4 illustrates a circuit configuration utilizing the principles of the invention for peak detection.
FIGURE 5 is a modified form of the basic circuit of the invention for use as a sampler.

The circuits set forth herein can be utilized for any of a number of different specific purposes. Two important actual uses are shown in FIGS. 4 and 5 representing, respectively, a peak detection means and a sampler. In each case the INPUT is provided with special adaptive circuit arrangements for obtaining the specific functional result desired and the remainder, or major portion, of the circuit is identical with that illustrated in FIG. 1. Also, of course, the enhancement of FIG. 2 can be built into either of these particular embodiments with advantageous results.

The INPUT modification for peak detection comprises replacing the switching means 15 with a unilateral current means 23, such as a semiconductor diode, for example, arranged in serial forward direction between the signal voltage to be peak detected and the upper common of the switching means 16 and the storage capacitor. Assuming now that the peak detection accomplished here is a continuous process there is some voltage to be read at this time at the output. If now the input voltage exceeds this output voltage the capacitor will begin to store as a result of charging current passing through the means 23. The charging will continue until the output becomes more positive than the input thereby serving to shut off the charging current. Accordingly, the charged condition of the capacitor represents the maximum value of the input voltage signal and on being read out provides a corresponding indication of the "peak" value of this same input signal. As before, the switching means 16 is closed prior to each peak determination for clearing out charge from the capacitor.

For use as a sampler (FIG. 5), a pair of unidirectional current means 24 and 25 each having an anode and a cathode, are connected anode-to-anode and interposed in series between the input signal and the storage capacitor. A control pulse source (not shown) provides gating pulses (having both positive and negative portions) through a scaling resistance 26 to the common anode connection of the means 24 and 25. After clearing out the capacitor by momentarily closing the switching means 16, a positive gating pulse is provided which biases the common anodes of the means 24 and 25 such that charging current begins to flow into the storage capacitor. The means 24 acts to limit charging of the capacitor to the level of the input voltage signal in the same manner that the means 23 controls charging in the peak detection circuit of FIG. 4. When the sample gate pulse goes negative both means 24 and 25 are shut off resulting in a cessation of charging. Accordingly, a value of charge is now stored which on discharge forms an indication of the peak value of input voltage existing during the positive swing of the gating pulse, or, in conventional terminology, the input voltage signal has been sampled.

A set of representative circuit components and associated operational voltages for the basic circuit of the invention as shown in FIG. 1 are as follows:

| | |
|---|---|
| Capacitor **10** | 0.1 microfarad. |
| Unidirectional current means **11** | 1N658 semiconductor diode. |
| Transistor element **12** | 2N657, manufactured by Texas Instruments, Inc. |
| Transistor element **13** | G.E. 4JD 1A69, manufactured by General Electric Co. |
| Resistance **14** | 1000 ohms. |
| Input signal | Square-wave, 6.0 volt positive signal pulses. |
| Positive bias | 9.5 v. D.C., positive. |

While the invention has been particularly shown and described with reference to preferred embodiments thereof, it will be understood by those skilled in the art that the foregoing and other changes in form and details may be made therein without departing from the spirit and scope of the invention.

What is claimed is:

1. A compensated charge storage circuit comprising:

a first switching means fed by a voltage to be stored;

a capacitor connected to the output side of said first switching means;

a second switching means shunted around said storage capacitor for clearing said capacitor of charge prior to a charge storage cycle;

a unidirectional current means interconnecting a predetermined one of the common points of said second switching means and said storage capacitor in a forwardly direction to ground;

an NPN transistor having its emitter connected to the said predetermined common point of said unidirectional current means and said storage capacitor and a grounded base; and a PNP transistor having its base fed by the collector of said NPN transistor, its emitter biased positively and the collector connected to the other of said common points, said collector serving as an output for the circuit.

2. A compensated charge storage circuit as in claim 1, wherein there is further provided a full-wave rectifying means to interrelate the voltage to be stored and said circuit for effecting a charge storage irrespective of the polarity of said voltage.

3. A compensated charge storage circuit as in claim 1, in which a rectifying means is inserted in forward direction between the input voltage and said storage capacitor whereby the charge accumulated on said storage capacitor on discharge provides an electric signal having direct correspondence to the peak value of the voltage being stored, said rectifying means comprising said first switching means.

4. A compensated charge storage circuit as in claim 2, in which means are electrically interposed between said full-wave rectifying means and said capacitor for providing connection therebetween during charge, and for breaking said connection during discharge and referencing the capacitor to ground; said means for providing and breaking the last mentioned said connection comprising said first switching means.

5. A compensated charge storage circuit as in claim 1, in which said circuit further is a sampling network wherein said first switching means comprises a pair of diode means in back to back relation serially interconnecting the voltage to be stored and said storage capacitor, an electrical scaling resistance connected to the common point of said diode means, and a sample gate voltage for supplying voltage pulses having positive and negative portions of known time relation through said scaling resistor to control the current passage capability of said diode means thereby providing charge storages on said storage capacitor representative of the peak values of input voltage signals during corresponding portions of the sample gate pulses.

6. A compensated charge storage circuit as in claim 1 wherein said unidirectional current means comprises first and second unidirectional current elements, and a serially connected compensating impedance and source of negative bias, said first element having its plate electrode connected to said predetermined common point in said forwardly direction and having its cathode electrode coupled to the cathode electrode of said second unidirectional current element, the plate electrode of said second element being connected to ground, said serially connected compensating current impedance and source of negative bias being connected to the common junction of said first and second elements to compensate for the voltage drop across the forward resistance of said first element during the charging cycle of said circuit and for the voltage drop across the base-to-emitter of said NPN transistor during the discharging cycle of said circuit.

References Cited by the Examiner

UNITED STATES PATENTS

| | | | |
|---|---|---|---|
| 2,591,053 | 4/52 | De Boisblanc | 320—1 X |
| 2,680,808 | 6/54 | Nolde | 320—1 X |
| 2,942,169 | 6/60 | Kalfaian | 320—1 |
| 3,025,411 | 3/62 | Rumble | 320—1 X |

IRVING L. SRAGOW, *Primary Examiner.*